US006986055B2

(12) United States Patent
Carlson

(10) Patent No.: US 6,986,055 B2
(45) Date of Patent: *Jan. 10, 2006

(54) METHOD FOR GENERATING RANDOM NUMBERS

(75) Inventor: Rolf E. Carlson, Albuquerque, NM (US)

(73) Assignee: Legal iGaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 09/143,907

(22) Filed: Aug. 31, 1998

(65) Prior Publication Data

US 2003/0028567 A1 Feb. 6, 2003

Related U.S. Application Data

(62) Division of application No. 08/959,575, filed on Oct. 28, 1997, now Pat. No. 6,272,223, which is a division of application No. 08/358,242, filed on Dec. 19, 1994, now Pat. No. 5,707,286.

(51) Int. Cl.
*H04L 9/32* (2006.01)

(52) U.S. Cl. .................................. 713/200; 463/22
(58) Field of Classification Search ................ 728/250; 380/46, 44; 463/22, 29; 713/200, 168, 176, 713/189, 193
See application file for complete search history.

(56) References Cited

U.S. PATENT DOCUMENTS

| | | | |
|---|---|---|---|
| 3,309,509 A | * | 3/1967 | Vasseur |
| 4,093,223 A | * | 6/1978 | Wilke et al. .................. 463/31 |
| 4,527,798 A | * | 7/1985 | Siekierski et al. .......... 708/250 |
| 4,636,951 A | | 1/1987 | Harlick |
| 4,652,998 A | * | 3/1987 | Koza et al. ................... 463/26 |
| 5,356,144 A | | 10/1994 | Fitzpatrick et al. |
| 5,398,932 A | * | 3/1995 | Eberhardt et al. ........... 463/29 |
| 5,420,928 A | * | 5/1995 | Aiello et al. |
| 5,515,307 A | * | 5/1996 | Aiello et al. ................. 380/46 |
| 5,707,286 A | * | 1/1998 | Carlson ....................... 463/16 |
| 5,857,025 A | * | 1/1999 | Anderson et al. |
| 5,954,582 A | * | 9/1999 | Zach .......................... 708/250 |
| 6,099,408 A | * | 8/2000 | Schneier et al. ............. 463/29 |

* cited by examiner

*Primary Examiner*—Ayaz Sheikh
*Assistant Examiner*—Brandon Hoffman
(74) *Attorney, Agent, or Firm*—Knobbe, Martens, Olson & Bear LLP

(57) ABSTRACT

An apparatus for implementing a game having a deterministic component and a non-deterministic component wherein a player uses the game through at least one player interface unit. Each player interface unit generates a player record indicating player-initiated events. A random number generator provides a series of pseudo-random numbers and a rules library stores indexed rules for one or more games. An interface registry stores mapping records where the mapping records are used to associate the player-initiated events to pre-selected rules in the rules library. A control means is coupled to the player interface to receive the output of the player interface unit, coupled to the interface registry, the rules library, and the random number generator. The control means processes the player record and returns an output record to the player interface unit where the output record is determined by executing the game's rules with reference to the pseudo-random numbers and predefined combinatorial algorithms for selecting sets of the pseudo-random numbers.

4 Claims, 9 Drawing Sheets

METHOD FOR GENERATING RANDOM NUMBERS

RELATED APPLICATION

This application is a divisional of applicant's U.S. patent application Ser. No. 08/959,575, filed Oct. 28, 1997, now U.S. Pat. No. 6,272,223, entitled "UNIVERSAL GAMING ENGINE," which is a divisional of 08/358,242, the applicant's now U.S. Pat. No. 5,707,286, issued Jan. 13, 1998, entitled "UNIVERSAL GAMING ENGINE" filed Dec. 19, 1994.

BACKGROUND OF THE INVENTION

1. Field of the Invention

The present invention relates, in general, to gaming machines, and, more particularly, to an electronic gaming engine supporting multiple games and multiple users.

2. Statement of the Problem

Casino gaming has grown rapidly in the United States. Casino gaming is experiencing similar growth throughout the world. An important segment of this developing industry is electronic games. An electronic implementation of a game requires a method for interpreting human actions as they occur within the constraints of the rules as well as the ability to respond with chance events.

Microprocessors allow games that formerly relied on analog devices for generating chance events, such as dice, to be simulated digitally. Simulating a die roll with a computer would seem to be a contradiction because the microprocessor is the embodiment of logic and determinism. With care, however, it is possible to create deterministic algorithms that produce unpredictable, statistically random numbers.

Contemporary games consist of a framework of rules that define the options for how a user or random event generator may change the game state. Play begins with an initial state. Subsequent play consists of user initiated events that trigger the execution of one or more rules. A rule may proceed deterministically or non-deterministically.

Typical games consist of deterministic and non-deterministic rules. A game progresses by the interaction of these rules. There are two sources for non-determinism: player decisions and chance events. In the game of Poker, for example, deciding to replace three instead of two cards in a hand is a player decision that is limited, but not predetermined, by rules. The rules limit the range of options the player has, but within that set of options the player is free to choose. An example of a chance event is the random set of cards received by the poker player. Shuffled cards do not produce a predictable hand.

Other examples that illustrate determinism and non-determinism in gaming are popular casino pastimes such as Blackjack, Keno, and Slot machines. The first Blackjack hand a player receives is two cards from a shuffled deck. The number of cards dealt is two, but the cards could be any from the deck. Keno is essentially a lottery. In Keno, a player attempts to guess twenty balls chosen from a basket of eighty balls. The rules dictate that to participate, a player must fill out a Keno ticket indicating the balls he believes will be chosen in the next round. the selection of balls, however, is a purely random event. Slot machines require the player to pull a handle for each round. Slot wheels stop at random positions.

The non-deterministic problem in most parlor games is random sampling without replacement: given a set of n elements, randomly choose m of them without replacement where m is less than or equal to n. Although sampling without replacement covers most popular games, it would be easy to conceive of games that required replacement. For example, consider a variant of Keno that replaces each chosen ball before selecting the next ball. Until now, no device is available that services the needs of multiple games by providing algorithms for sampling with and without replacement as well as others such as random permutation generation, sorting, and searching.

A casino player must know the likelihood of winning a jackpot is commensurate with the stated theoretical probabilities of the game. Moreover, the casino would like to payout as little as possible while maximizing the number of their game participants. Because each game sponsored by a casino has a built-in theoretical edge for the house, over time and with repeated play, the house will make money. In other words, the casino does not need to cheat the customer because it has a built-in edge. The customer, who is at a disadvantage in the long run, will want to know the game is fair in order to manage risk. In is a theoretical fact that bold wagering in Roulette increases a players odds of winning. A player who cannot know the odds of winning cannot formulate a strategy.

Provided that the deterministic rules of a game are implemented correctly, it is essential that the chance events of a game are indeed random. An important subproblem for generating random events is uniform random number generation. If the underlying uniform random number generator does not generate statistically independent and uniform pseudo-random numbers, then either the house or customer will be at a disadvantage. A poorly designed system might favor the house initially and over time turn to favor the player. Certainly the house would not want this situation because it makes revenue projection impossible. Any regulatory body would like to ensure that neither the house nor customer have an advantage beyond the stated theoretical probabilities of the game. In the context of fairly implemented rules, the only way for the house to increase its revenue is to increase the number of players participating in their games.

Typically, an engineer creating an electronic game generates a flow chart representing the rules and uses a random number generator in conjunction with combinatorial algorithms for generating chance events. Representing rules is one problem. Generating chance events to support those rules is another. Creating pseudo-random numbers is a subtle problem that requires mathematical skills distinct from other problems of gaming. In other words, a skilled game programmer may be unable to solve the problems of developing a proper random number generator. Even if given a quality random number generator, problems can occur in hardware implementations that render the generator predictable. One example is using the same seed, or initial state, for the generator at regular intervals and repeatedly generating a limited batch of numbers. Without attending to the theoretical aspects of a uniform random number generator, it is not possible to implement the rules of a game perfectly. The result is a game unfair to the house, players, or both. Hence, there is a need for a gaming system, apparatus, and method that separate the problem of implementing game rules from that of random event generation.

The need for such a device is also evident at the regulatory level. Gaming is a heavily regulated industry. States, tribes, and the federal government have gaming regulatory agencies at various levels to ensure fairness of the games. The gaming regulatory authority certifies that a particular implementations of a game reflects the underlying probabilities.

Because electronic games are implemented in often difficult to understand software, the problem of verifying fairness of a game is challenging. Further, there is little uniformity in the implementation of fundamental components of various games. To determine fairness, the gaming authority subjects each game to a battery of tests. No set of statistical tests performed on a limited portion of the random number generator period can ensure that the generator will continue to perform fairly in the field. The process of testing is both expensive and of limited accuracy. Hence, a regulatory need exists for a uniform, standardized method of implementing games that reduce the need and extent of individual game testing while increasing he reliability of detecting and certifying game fairness.

3. Solution to the Problem

The Universal Gaming Engine (UGE) in accordance with the present invention is a gaming apparatus providing a consistent game development platform satisfying the needs of the gaming authority, house, player, and game developer. The UGE separates the problems of developing game rules from the difficulty of producing chance events to support those rules. Functions that are common to a number of games are included in the gaming engine so that they need not be implemented separately for each game. By including basic functions shared by a number of games, hardware costs are greatly reduced as new games can be implemented merely by providing a new set of rules in the rules library and the basic hardware operating the game remains unchanged.

SUMMARY OF THE INVENTION

Briefly stated, the present invention provides a system, apparatus, and method for implementing a game having a deterministic component and a non-deterministic component wherein a player uses the game through at least one player interface unit. Each player interface unit generates a player record indicating player-initiated events. A random number generator provides a series of pseudo-random numbers that are preferably statistically verified by integral verification algorithms and stored in a buffer. Preferably, the random number generator allows seed and key restoration automatically or manually upon power fault.

A rules library stores indexed rules for one or more games. An interface registry stores mapping records where the mapping records are used to associate the player-initiated events to pre-selected rules in the rules library. A control means is coupled to receive the output of the player interface unit, coupled to the interface registry, the rules library, and the random number generator. The control means processes the player record and returns an output record to the player interface unit where the output record is determined by executing the game's rules with reference to the pseudo-random numbers and predefined combinatorial algorithms for selecting sets of the pseudo-random numbers.

DETAILED DESCRIPTION OF THE DRAWING

1. Overview.

Figure 1:
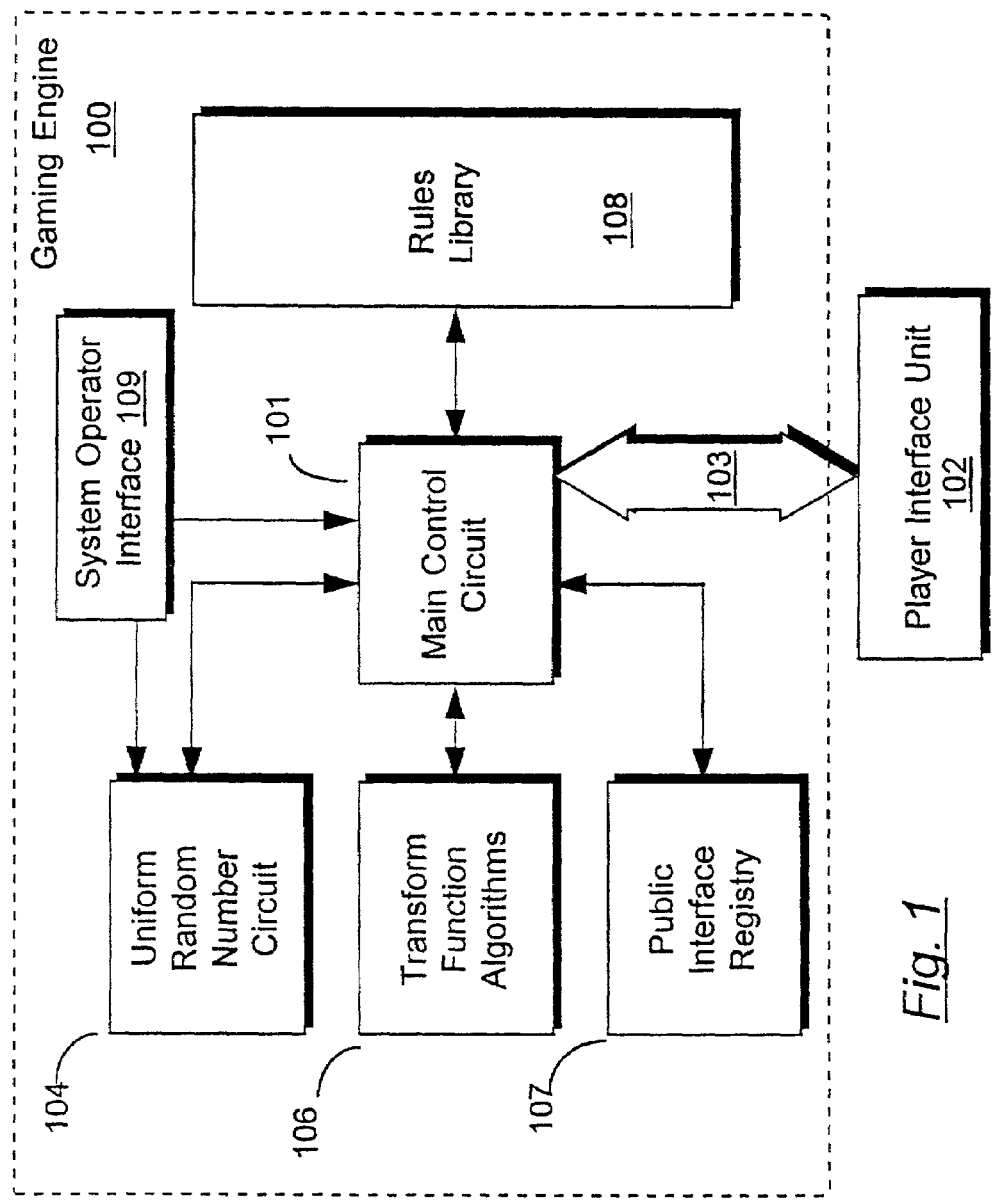
FIG. 1 illustrates a simplified block diagram of the gaming engine in accordance with the present invention.

FIG. 1 illustrates, in simplified schematic form, a gaming apparatus in accordance with the present invention. The gaming apparatus in accordance with the present invention is also referred to as a "universal gaming engine" as it serves in some embodiments as a platform for implementing any number of games having deterministic and random components. In other embodiments, the universal gaming engine in accordance with the present invention provides a platform that supports multiple players across a network where each player preferably independently selects which game they play and independently controls progression of the game.

Although in the preferred embodiment all of the games discussed are implemented entirely electronically, it is a simple modification to alter the player interface to include mechanical switches, wheels, and the like. Even in mechanically implemented games electronic functions that are performed by the gaming engine in accordance with the present invention are required. Hence, these mechanical machines are greatly simplified using the gaming engine in accordance with the present invention.

Gaming engine 100 is illustrated schematically in FIG. 1, including major subsystems in the preferred embodiments. Each of the subsystems illustrated in FIG. 1 is described in greater detail below. FIG. 1, however, is useful in understanding the overall interconnections and functioning of the gaming engine in accordance with the present invention.

Gaming engine 100 performs several basic functions common to many electronically implemented casino games. The most basic of these functions includes interacting with the player to detect player initiated events, and to communicate the state of a game to the player. Gaming engine 100 must process the player initiated event by determining the appropriate rules of the game that must be executed and then executing the appropriate rules. Execution of the rules may require only simple calculation or retrieving information from memory in the case of deterministic rules, or may require access to pseudo-random values or subsets of pseudo-random values in the case of non-deterministic components.

Gaming engine 100 in accordance with the present invention uses a main control circuit 101 to control and perform basic functions. Main control circuit 101 is a hardware or software programmable microprocessor or microcontroller. Alternatively, main control circuit 101 can be implemented as an ASIC device with dedicated logic to perform the required control functions. Main control circuit 101 communicates with player interface unit 102 via interface bus 103. Player interface unit 102 is a machine having at least some form of display for communicating information to the player and some form of switch (i.e., buttons, levers, keyboard, coin slot, or the like) for communicating information from the player.

Player interface unit 102 generates a player record of information and transmits the player record over bus 103 to main control circuit 101. The player record of information contains information about the player initiated event as well as any data that may be associated with the particular event. For example, a player initiated event may be drawing two cards from a deck of cards. The player record will include information about the event (i.e., drawing cards), and data (i.e., two cards). The player record may include other information such as the state of the game that is being played. By "state of the game" it is meant at which stage in the rule defined progression of the game the game currently exists. State information may be maintained by gaming engine 100 or player interface unit 102, or both.

Main control circuit 101 responds to a player initiated event by referencing a public interface registry 107. Public interface registry 107 is essentially a lookup table implemented in volatile, semi-volatile, or non-volatile memory. Public interface registry 107 is desirably organized as an addressable memory where each address is associated with a mapping record. Main control circuit 101 uses the player event portion of the player record to address public interface registry 107 in a preferred embodiment. Public interface registry 107 then provide a selected mapping record to main control circuit 101. Main control circuit 101 uses the selected mapping record to address rules library 108.

Rules library 108 is essentially an addressable memory preferably allowing random access. Rules library 108 can be implemented in volatile, semi-volatile, or non-volatile memory of any convenient organizational structure. Rules library 108 responds to the address from main control circuit 101 by supplying one or more rules, which correspond to game rules, to main control circuit 101. The rules provided by rules library 101 are preferably executable instructions for main control circuit 101.

Main control circuit 101 processes the selected rules by selectively accessing random number circuit 104 and transform function algorithms 106. As set out herein before, completely deterministic rules may be executed entirely within main control circuit 101 by simple calculations or data transfer operations. Where the selected rule requires main control circuit 101 to access one or more pseudo-random numbers, random number circuit 104 is accessed. In the preferred embodiment random number circuit 104 provides a series of pseudo-random numbers of arbitrary length having uniform distribution as described in greater detail hereinafter.

Often times, however, a rule will require a non-uniform distribution of pseudo-random numbers, or some subset of a series of pseudo-random numbers. In this case, main control circuit 101 implements the selected rule by accessing transform function algorithms from block 106 in FIG. 1. The transform function algorithms transform the series of uniformly distributed pseudo-random numbers from random number circuit 104 by 1) transforming them into a non-uniform distribution, 2) using a given set of the uniformly distributed pseudo-random numbers to performing set selection permutations or 3) both.

In this manner, the basic functions of pseudo-random number generation, pseudo-random number transformation, and association of rules with player or player events are standardized and entirely contained in gaming engine 100. System operator interface 109 is used by the casino or game developer to communicate with uniform random number circuit 104 and main control circuit 101. This communication is desirable to initialize, program, and maintain main control circuit 101 and public interface registry 107, for example. System operator interface also enables an operator to initialize, monitor and change seed values and key values used by uniform random number circuit 104. Any convenient hardware may be used to implement system operator interface 109 including DIP switches, a smart terminal, personal computer, or a dedicated interface circuit.

To implement a game, a game programmer develops a series of rules for the game. The series of rules are stored as a volume in rules library 108. The game programmer will then register the new game in public interface registry 107 by storing the location of the volume of rules in an appropriate address in public interface registry 107. The game programmer does not need to program or develop the random number circuit or transform algorithms to implement a new game. Further, the player using player interface unit 102 can access any of the games stored in rules library 108. To certify a new game, a game regulatory authority need only review the rules in the rules library 108 to verify that they follow the established rules for a particular game. This verification can be easily done by reviewing high-level language code such as FORTRAN, C, or Basic.

While the present invention is described in terms of the preferred implementation of casino games it should be understood that any game which has a random component and progresses by following pre-defined rules can be implemented in gaming engine 100. Player interface unit 102 may be entirely electronic or combine electronic and mechanical components. Player interface unit may supply any amount and kind of information in addition to the basic functions set forth above to main control circuit 101. Player interface unit 102 may be located in the same physical machine as the remaining portions of gaming engine 100 or may be located at a great distance from gaming engine 100. These and other alternatives will be discussed in greater detail hereinafter.

2. Random Number Circuit.

Figure 2:
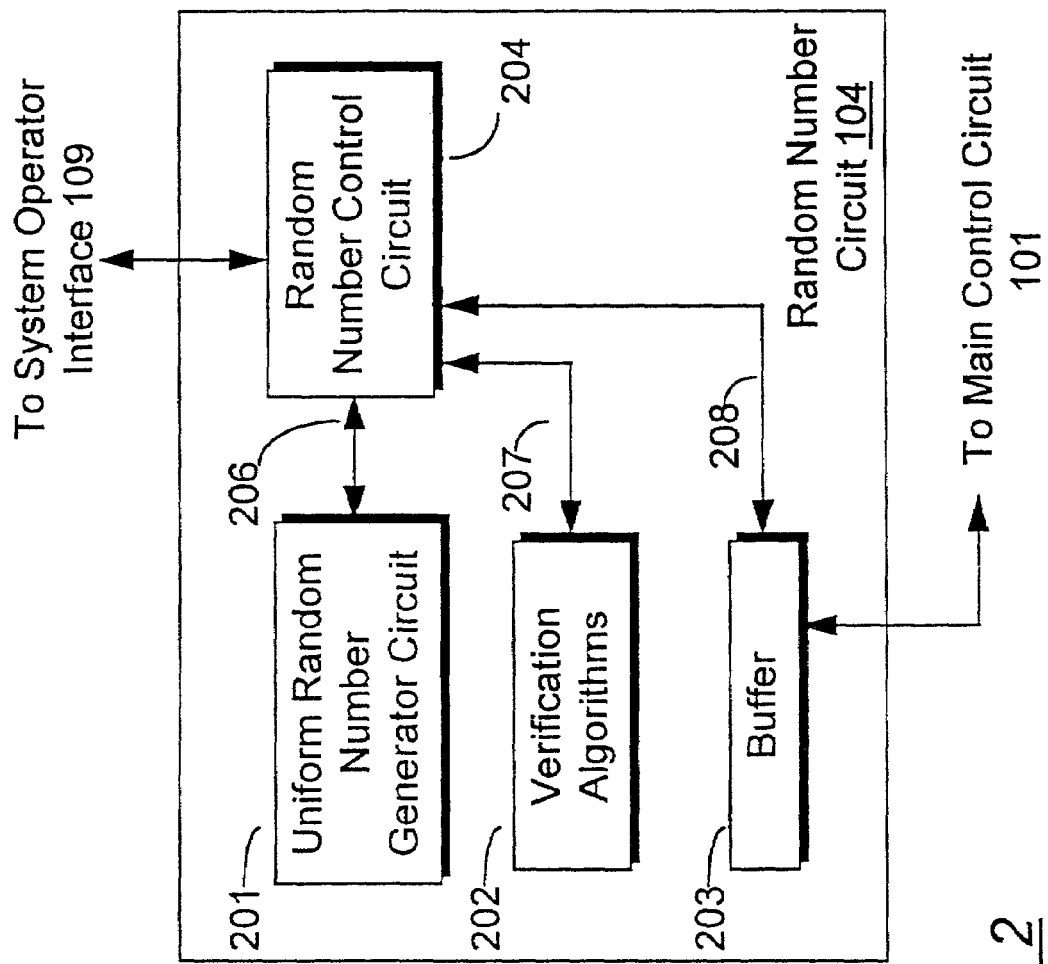
FIG. 2 illustrates a block diagram of the pseudo-random number subsystem in accordance with the present invention.

A preferred random number circuit 104 is shown in FIG. 2. Random number circuit 104 preferably includes random number generator circuit 201, verification algorithms 202, and buffer 203. Random number circuit 104 is controlled by random number control circuit 204 which is a microprocessor, microcontroller, or dedicated logic control circuit.

Random number generator circuit 201 provides a stream of uniformly distributed pseudo-random numbers on output 206. Alternatively, random number generator circuit 201 can provide parallel outputs on output 206. Also, more than one random number generator circuit 201 may be employed depending on the quantity of pseudo-random numbers demanded by the system.

Random number generator circuit 201 preferably supplies uniformly distributed pseudo-random numbers because a set of uniformly distributed numbers can be transformed easily by transform algorithms 106 into non-uniform distributions and combinatorial subsets. A preferred circuit for implementing random number generator circuit 201 is an ANSI X9.17 pseudo random number generator based upon a plurality of data encryption standard (DES) encryption circuits. Alternatively, random number generator circuit 201 may be implemented using the international data encryption algorithm (IDEA) encryption. Other random number generator circuits are known. When implementing other random number generator circuits 201, however, it should be appreciated that a high-quality, cryptographically strong pseudo-random number generator is preferable. A major advantage of the present invention is that the random number circuit 104 need be implemented only once to serve a plurality of games making it cost efficient to use relatively expensive circuitry to provide a high quality random numbered circuit 104.

Random number generator circuit 201 accepts as input one or more key values which are typically binary values having a fixed relatively large number of bits. For example, the ANSI X9.17 pseudo-random number generator uses 56-bit keys. Random generator circuit 201 also usually accepts a seed value, which is also another large bit binary value. Further, random number generator circuit 201 has a data input or clock input that accepts a continuously variable signal which is conveniently a clock representing date and time. In this manner, each time the signal on the clock or data input changes a new random number is output on line 206. Random number control circuit stores and provides the key values, seed value, and clock values to random number generator circuit 201.

A desirable feature in accordance with the present invention is that random number circuit 104 be able to boot up after a power fault (i.e., power is removed from the sytsem) using the same seed values, key values, and clock value that existed before the power fault. This feature prevents a player or operator from continually resetting the system or gaining any advantage by removing power from gaming engine 100. One way of providing this functionality is to buffer the key values, seed values, and clock values in memory within random number control circuit 204 before they are provided to random number generator 201. After a power on default, circuit 104 can reboot autonomously using the values stored in buffers. Alternatively, new values can be provided via system operator interface 109 to ensure that the output after a power fault is in no way predictable based upon knowledge of output after a prior power fault.

In a preferred embodiment, random number generator circuit operates continuously to provide the series of random numbers on line 206 at the highest speed possible. By continuously, it is meant that random number generator circuit 201 operates at a rate that is not determined by the demand for random numbers by the rest of the system. Random number control circuit 204 provides key values, seed values, and data values to random number generator circuit 201 independently of any processing demands on main control circuit 101 (shown in FIG. 1). This arrangement ensures that random number circuit 104 operates at a high degree of efficiency and is not slowed down by computational demands placed on main control circuit 101. In other words, the control circuit resources that implement random number control circuit 204 are independent of and usually implemented in a separate circuit from main control circuit 101.

Random number control circuit 204 accesses one or more verification algorithms 202 via connection 207. Verification algorithms 202 serve to verify that the raw random numbers on line 206 are statistically random to a predetermined level of certainty. Preferably, verification algorithms 202 include algorithms for testing independence, one-dimensional uniformity, and multi-dimensional uniformity. Algorithms for accomplishing these tests are well known. For example, independence of the pseudo random numbers can be performed by a Runs test. Uniformity can be verified by the Kolmorgorov-Smirnov or K-S test. Alternatively, a Chi-square test verify uniformity. A serial test is an extension of the Chi-square test that can check multi-dimensional uniformity.

Random number control circuit 204 preferably receives and stores a set of raw random numbers from random number generator circuit 201. The set of raw random numbers can be of any size, for example 1000 numbers. Random number control circuit 204 then implements the verification algorithms either serially or in parallel to test independence and uniformity as described hereinbefore. It may be advantageous to use more than one physical circuit to implement random number control circuit 204 so that the verification algorithms may be executed in parallel on a given set of raw random numbers.

If a set of raw random numbers do not pass one of the verification tests the numbers are discarded or overwritten in memory so that they cannot be used by gaming engine 100. Only after a batch of numbers passes the battery of verification tests, are they passes via line 208 to verify random number buffer 203. Buffer 203 is preferably implemented as a first-in, first-out (FIFO) shift register of arbitrary size. For example, buffer 203 may hold several thousand or several million random numbers.

By integrating verification algorithms 202 in a random number circuit 104, gaming engine 100 in accordance with the present invention ensures that all of the pseudo-random numbers in buffer 203 are in fact statistically random. This overcomes a common problem in pseudo-random number circuits wherein the random numbers are long-term random, but experience short-term runs or trends. These short-term trends make prediction of both the player and casino odds difficult and may create an illusion of unfairness when none in fact exists. The verification algorithms 202 in accordance with the present invention largely eliminate these short-term trending problems and create a pool of random numbers in buffer 203 that are both statistically random and will appear to be random in the short run time period in which both the casino and players operate.

Buffer 203 makes the random numbers available continuously to main control circuit 101. Main control circuit 101 may access any quantity of the numbers in buffer 203 at a time. Buffer 203 also serves to provide a large quantity of random numbers at a rate higher than the peak generation rate of random number generator circuit 201. Although it is preferable that random number generator circuit 201 and verification algorithms 202 are processed so as to provide random numbers to buffer 203 at a higher rate than required by gaming engine 100, short-term bursts of random numbers can be provided by buffer 203 at a higher rate.

3. Transform Function Algorithms.

Figure 3:
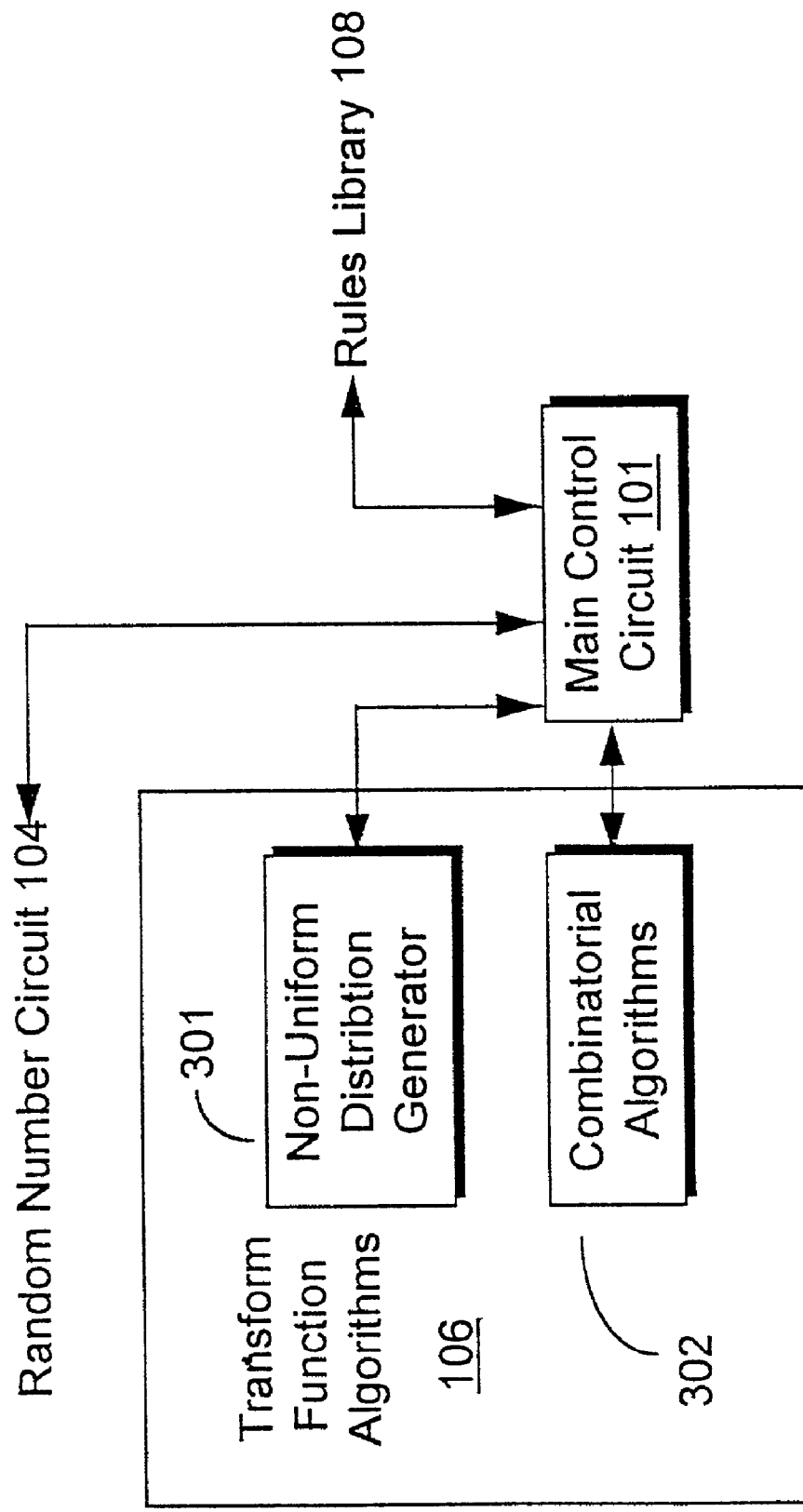
FIG. 3 illustrates the non-uniform distribution generator and combinatorial algorithm subsystems in accordance with the present invention.

Transform function algorithms 106 are accessed by main control circuit 101 as illustrated in FIG. 3. Examples of transform function algorithms 106 are a non-uniform distribution generator 301 and combinatorial algorithms 302. To execute some rules obtained from rules library 108, main control circuit 101 may be required to select one or more random values from a non-uniform distribution. Examples of non-uniform distributions are normal distribution, exponential distribution, gamma distribution, as well as geometric and hypergeometric distributions. All of these non-uniform distributions can be generated from the uniform distribution provided by random number circuit 104.

Rule implementations primarily require that main control circuit 101 access a series of pseudo-random numbers in the context of random set selection and permutations. This subset selection is performed by combinatorial algorithms 302. The combinatorial algorithms 302 operate on either the uniform number distribution provided directly by random number circuit 104 or the non-uniform distribution provided by non-uniform distribution generator 301. In this manner, a game of keno can be implemented by selecting a random 20 from a group of 80.

Another function of the transform algorithms 106 is to scale and center the series of random numbers. For example, a deck of cards includes 52 cards so that the set of random numbers must be scaled to range from 1 to 52. These and similar transform functions are well known.

An advantageous feature of the present invention is that these transform functions can be implemented a single time in a single piece of software or hardware and selectively accessed by any of the games in rules library 108. This allows a great variety of transform functions to be provided in a cost efficient and computationally efficient manner. The game designer need only provide rules in rules library 108 that access appropriate transform function algorithms 106 and need not be concerned with the details of how the transform function algorithms 106 are implemented. Similarly, a gaming regulatory authority can verify the correctness and fairness of transform algorithms a single time by providing extensive testing. Once the transform functions are verified, they need not be verified again for each game that is implemented in rules library 108. This independence between the rules programming and the non-deterministic programming result in highly standardized and reliable games while allowing the games designer greater flexibility to design a game in the rules library 108.

4. Main Control Circuit.

Figure 4:
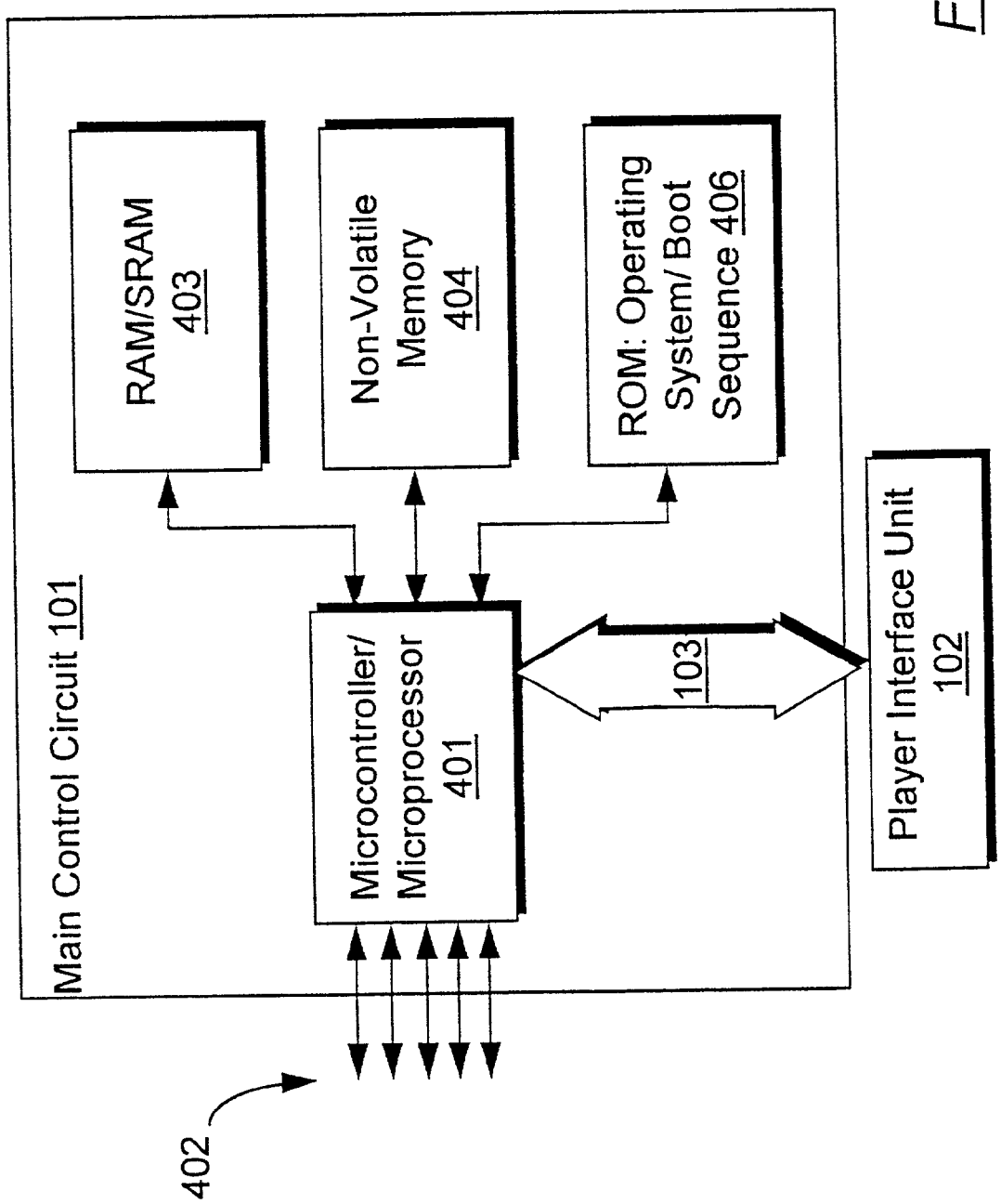
FIG. 4 illustrates a main control circuit in accordance with the present invention.

A preferred embodiment of main control circuit 101 is shown in block diagram form in FIG. 4. Preferably, a micro-controller microprocessor 401 is provided to perform calculations, memory transactions, and data processing. Microprocessor 401 is coupled through bus 103 to player interface unit 102. Microprocessor 401 is also coupled to player number circuit 104, transform function algorithms 106, public interface registry 107, and rules library 108 through bi-directional communication lines 402.

In a typical configuration, main control circuit 101 will have a quantity of RAM/SRAM 403, a quantity of non-volatile memory 404, and ROM for storing an operating system and boot sequence. ROM 406 operates in a conventional manner and will not be described in greater detail hereinafter. Non-volatile memory 404 is an addressable, preferably random access memory used to store information that is desirably saved even if power is removed from main control circuit 101. For example, microprocessor 401 may calculate statistics regarding the type of games played, the rate of game play, the rate of number request, or information about the player from player interface unit 102. The statistics are preferably stored in a non-volatile memory 404 to maintain integrity of the information. Similarly, non-volatile memory 404 may be used to maintain the state of a game in progress on player interface unit 102 so that is power is removed, universal gaming engine 100 can restore player interface unit 102 to the state at which it existed prior to the power outage. This may be important in a casino operation where the casino could incur liability for stopping a game when the player believes a payoff is imminent.

RAM 403 serves as operating memory for temporary storage of rules access from rules library 108 or for storing the operating system for quick access. RAM 403 may also store groups of random numbers while they are being processed by the transform function algorithms as well as address data provided to and accepted from the public interface registry.

It should be understood that main control circuit 101 may be implemented in a variety of fashions using conventional circuitry. While some memory will almost surely be required, the memory may be implemented as RAM, SRAM, EPROM or EEPROM to meet the needs of a particular application. Similarly, the components of main control circuit 101 shown in FIG. 4 may be implemented as a single circuit or single integrated circuit or in multiple circuits or integrated circuits. Additional features may be added to implement additional functions in a conventional manner.

5. Rules Library.

Figure 5:
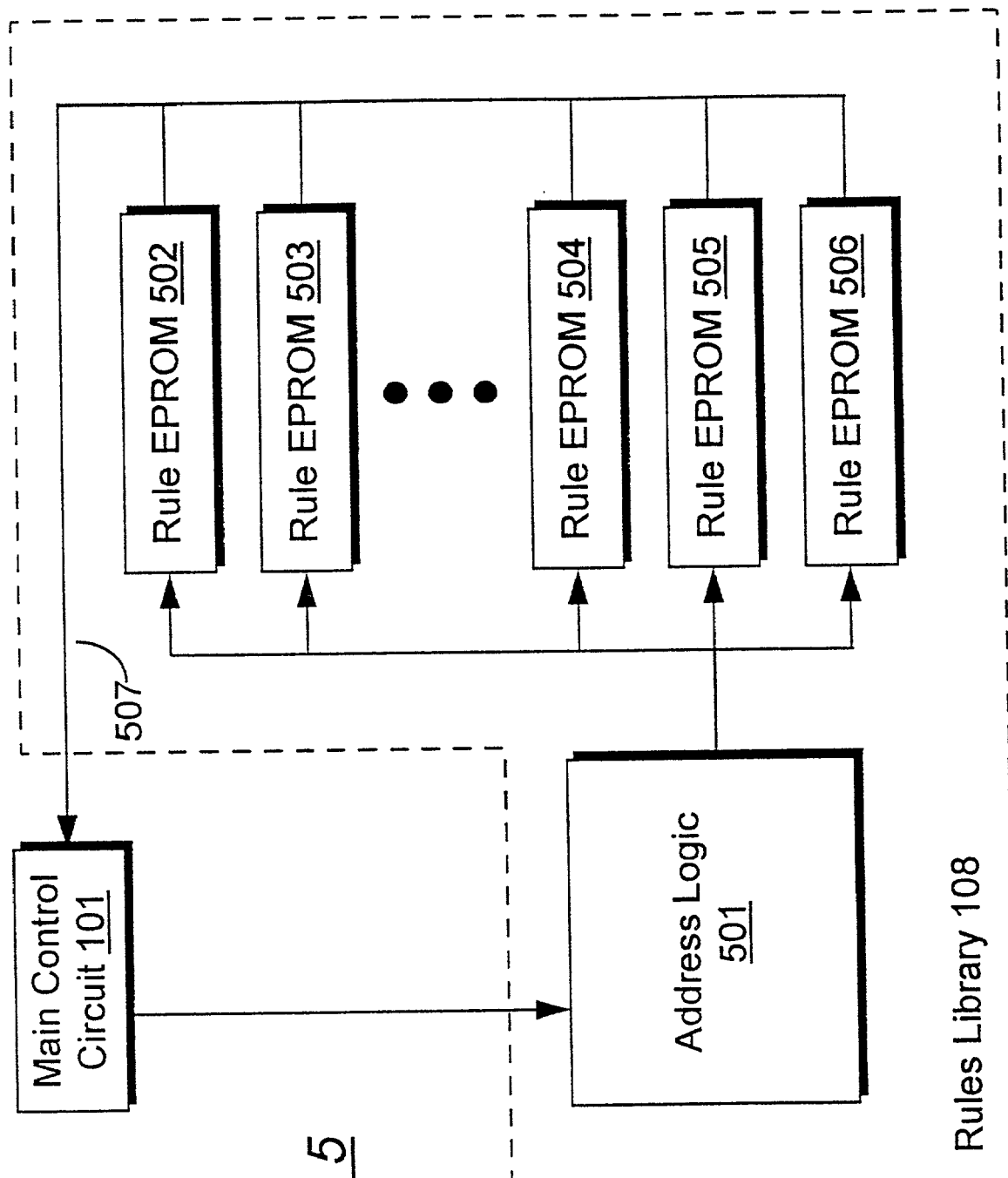
FIG. 5 illustrates in block diagram form implementation of the rules library in accordance with the present invention.

An exemplary embodiment of rules library 108 is illustrated in block diagram form in FIG. 5. Rules library 108 is preferably implemented as a plurality of volumes of rules where each volume is fixed in a rule EPROM 502–506. Any number of rule EPROM's can be supplied in rule library 108. Also, rule EPROM's 502 can be of various sizes. Rule EPROM's 502–506 may be replaced with equivalent memory circuits such as RAM, S RAM, or ROM. It is desirable from a gaming regulatory authority standpoint that rule EPROM's 502–506 cannot be altered once programmed so that the rules cannot be changed from the designed rules. This allows the gaming regulatory authority to verify the EPROM rules.

Address logic 501 provides address signals to select one of rule EPROM's 502–506. Additionally, address logic 501 serves to position a pointer to a specific rule within each rule EPROM 502–506. As set out herein before, which of rule EPROM's 502–506 is selected as determined by the current game being played as indicated by player interface unit 102 (shown in FIG. 1). The location of the pointer within a rule EPROM is addressed based upon the current state of the game and the particular user initiated event indicated by player interface unit 102. The information is conveyed from the user interface unit 102 in a player record that is mapped to rule library 108 by the information in public interface registry 107.

In practice, a game developer will program a series of rules that dictate the progression of a game in response to user or player initiated events. The rules will also dictate when random numbers are accessed and the type of random numbers which should be accessed (i.e., uniform or non-uniform distributions). Rules will also control payoffs, and place boundaries on the types of player events which will be accepted. The game developer will then burn these rules, once complete, into a rule EPROM, such as rule EPROM's 502–506. The rule EPROM can then be verified by a gaming regulatory authority, and once approved, be distributed to owners of gaming engines wishing to implement the newly developed game. In order to install the new game, the rule EPROM is installed in rules library 108 and registered in public interface registry 107. The registration process described hereinbefore provides gaming engine 100 the address information necessary to enable address logic 501 to access a particular rule in rules library 108 and provide that rule on output line 507 to main control circuit 101.

Although rules library 108 has been described in terms of a plurality of EPROM's 502–506 wherein each EPROM holds one volume of rules pertaining to a particular game, it should be apparent that many other configurations for rules library 108 are possible. Rules can be implemented in a single large memory or in a serial memory such as a tape or disk. Address logic 500 may be integrated in rules library 108, or may be integrated with main control circuit 101. Each game may be implemented in a single EPROM or may require several EPROM's depending on the particular needs of an application.

6. Method of Operation.

Figure 6:
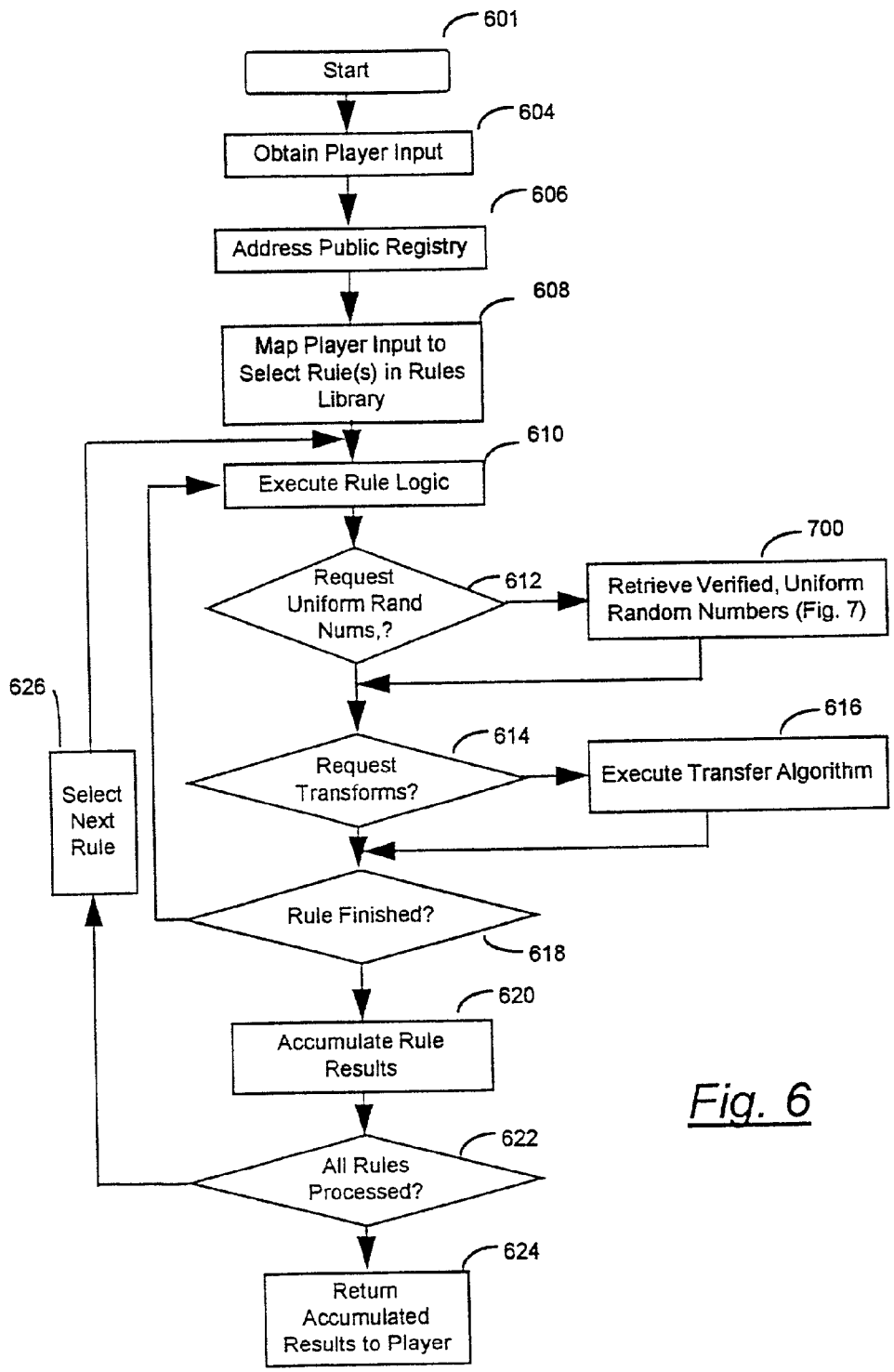
FIG. 6 illustrates a flow chart of a game implementation using the apparatus shown in FIG. 1.
Figure 7:
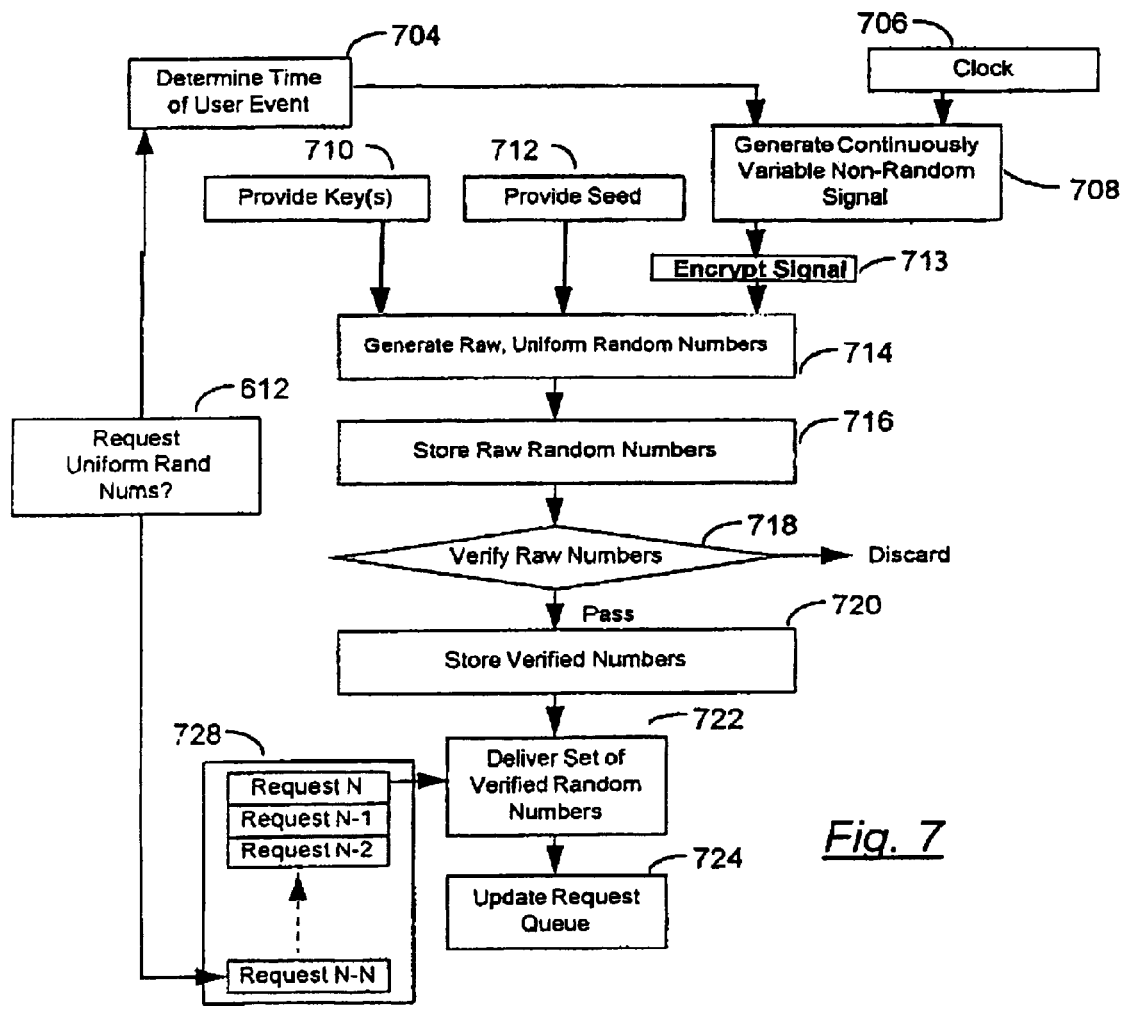
FIG. 7 illustrates a flow diagram for a second embodiment pseudo-random number distribution system.

FIG. 6 and FIG. 7 together illustrate in flow chart form a preferred method of operation of gaming engine 100 in accordance with the present invention. FIG. 6 details operation of a first embodiment single player gaming engine 100. When gaming engine 100 is started as indicated at 601 in FIG. 6, main control circuit 101 is initialized and goes through a boot-up sequence to bring it to an initial state. In this initial state it waits for user input at step 604. The player input or player record preferably indicates the game that is being played, the state of that game, and user initiated events and data that must be processed. Upon receipt of the player record, the public registry is addressed in step 606. The public registry returns a mapping record that matches the user record with a particular rule in the rules library in step 608.

One or more rules are accessed in step 608. Each of the one or more rules are processed in serial fashion in the embodiment illustrated in FIG. 6. One rule is processed in each pass through steps 610–622. A logical component of a first rule is processed in step 610, where the logical component includes processes of memory manipulations, calculations, and the like. In step 612, it is determined if the particular rule that was executed in step 610 requires pseudo-random numbers to process. If pseudo-random numbers are required, they are retrieved in step 700 which is illustrated in greater detail in reference to FIG. 7.

It is determined if the rule requires any transform algorithm in step 614. If a transform algorithm is required it is obtained in step 616. It should be understood that the transform algorithm may be permanently resident in the main control circuit 101 and so the step of obtaining 616 may be trivial. Once the necessary transfer algorithm is obtained, it is determined if the rule is completely processed in step 618. If not, flow returns to step 610 and the rule logic is executed until the rule is completely processed and a final result of the rule is determined. Once the rule is finished, control moves from step 618 to result accumulation step 620.

Each rule accessed in step 608 is processed in a similar manner by sequentially selecting each rule in step 626 until it is determined that all rules have been processed in step 622. Once all the rules are processed, the accumulated results are returned to the player in step 624. The results are of the rule are determined in steps 610, 612, and 614 by performing any transforms required on the random numbers, executing any deterministic components using conventional calculations and memory transactions.

7. Method for Random Number Generation.

FIG. 7 illustrates a flow chart showing steps in filling random number request step 700 in FIG. 6. The process shown in FIG. 7 is initiated when request 614 is made. More accurately, many of the sub-processes shown in FIG. 7 are ongoing, but the processes for generating and supplying random numbers are also responsive to the request for random numbers 700.

Continuously ongoing processes include clock generation step 706, providing key value(s) step 710, and providing seed value(s) step 712. The clock signal generated in step 706 need not be a real time clock, nor does it have to provide a linearly increasing or decreasing output. It is sufficient that clock 706 output a continuously variable signal at a regular interval. As set out herein before, clock generation is preferably performed by random number control circuit 204 shown in FIG. 2.

In a preferred embodiment, a signal is generated by the occurrence of the player event. For example, the time of the player event is determined at step 704 and may be used as shown in FIG. 7. At step 708, the clock signal and the player event signal are combined to provide a continuously variable non-random signal. Where both the player event signal and the clock are digital, the combination can be realized as logical function such as AND, OR, XOR, NAND or the like. Also, the combination may be a concatenation or subtraction function. This feature of the present invention is optional, but adds a new degree of randomness.

The continuously variable nonrandom signal from the generator 708 passes through an encryption stage 713.

At step 714, a series of raw random numbers is generated using the continuously provided key values, seed values, and variable signal. The raw random numbers are stored at step 716 to build a group large enough to be verified during step 718. Groups of raw random numbers that fail verification step 718 are discarded, while those that pass are stored at step 720 in buffer 203 shown in FIG. 2.

In accordance with a first embodiment, the verified random numbers are delivered in step 722, returning process flow to step 618 shown in FIG. 6. In an alternative embodiment shown in FIG. 7, request 614 is queued at step 728 using RAM 403 shown in FIG. 4. Request queuing 728 is implemented as a first in first out or "push up" register having N queue capacity. In one embodiment, N is between 2 and 10. Queuing step 728 stores each request and processes each request in turn. In this embodiment, delivery step 722 serves whatever request is provided during step 728. Once a request is delivered, the request queue is updated in step 724.

Although the request queue is optional, it increases efficiency of random number generation step 700. This is especially important in the networked multi-user embodiment shown in FIG. 8. FIG. 9 illustrates generally a relationship between server speed, queue size, and the average number of customers, or requests for pseudo-random numbers, are waiting in the system. FIG. 9 is derive by modeling gaming engine 800 (shown in FIG. 8) as an M/M/1 queue to produce parameters for expected wait times in the system. FIG. 9 assumes that requests for pseudo-random numbers are made according to a Poisson process. This means that the times between successive arrivals are independent exponential random variables.

Upon arrival, a customer either immediately goes into service if the server is free, or joins queue 728 if the server is busy. When step 722 finishes obtaining the requested subset, the request is returned to the game and leaves the system. The next request, if any, is serviced. The times required to form the requested random subsets are assumed to be independent exponential random variables also. With these assumptions, request queue 728 can be viewed as an M/M/1 queue. The first two M's indicate that both the interarrival times as well as the service times for requests are exponential random variables. The "1" indicates there is just one server.

Server speed is largely determined by the hardware chosen to implement the present invention, and can be easily varied by those of skill in the art to meet the needs of a particular application. As is apparent in FIG. 9, higher server speeds result in fewer waiting customers. From the lower portion of FIG. 9, is apparent that if the queue size is reduced to zero (i.e., no request queue), the average wait time climbs even with very fast servers. Hence, to minimize wait time, a request queue is desirable.

It should be understood that the process steps shown in FIG. 7 may be carried out in any convenient order unless expressly specified above. Process steps may be carried out in serial or parallel depending on the particular capabilities of main control circuit 101 shown in FIG. 1. For example, where control circuit 101 is multi-tasking or capable of parallel processing, several process steps may be executed at once. Also, process steps may be added to those shown in FIG. 7 to implement additional functions without departing from the inventive features of the present invention.

8. Network Embodiment.

Figure 8:
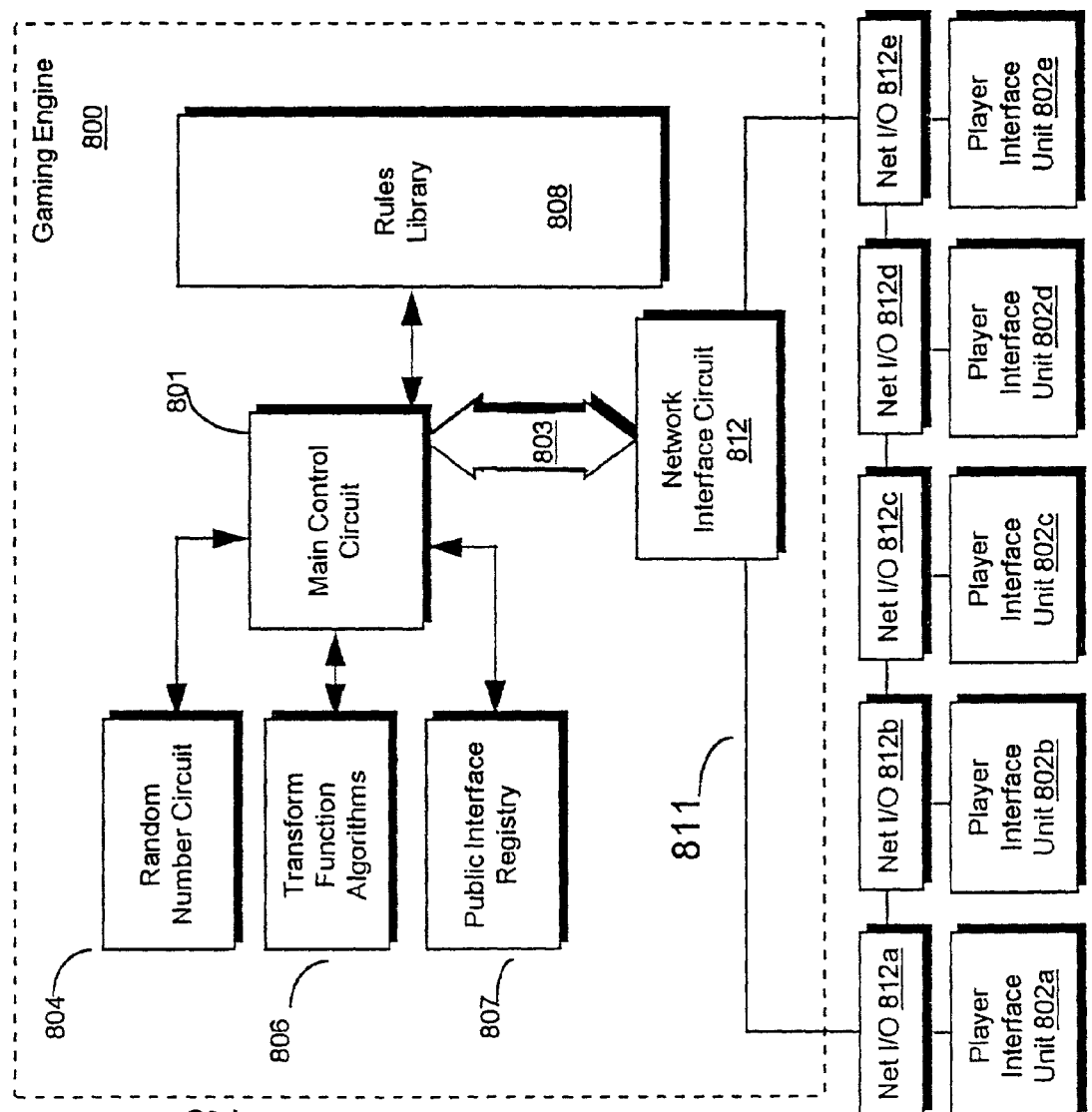
FIG. 8 illustrates a multiple player networked implementation in accordance with the present invention.
Figure 9:
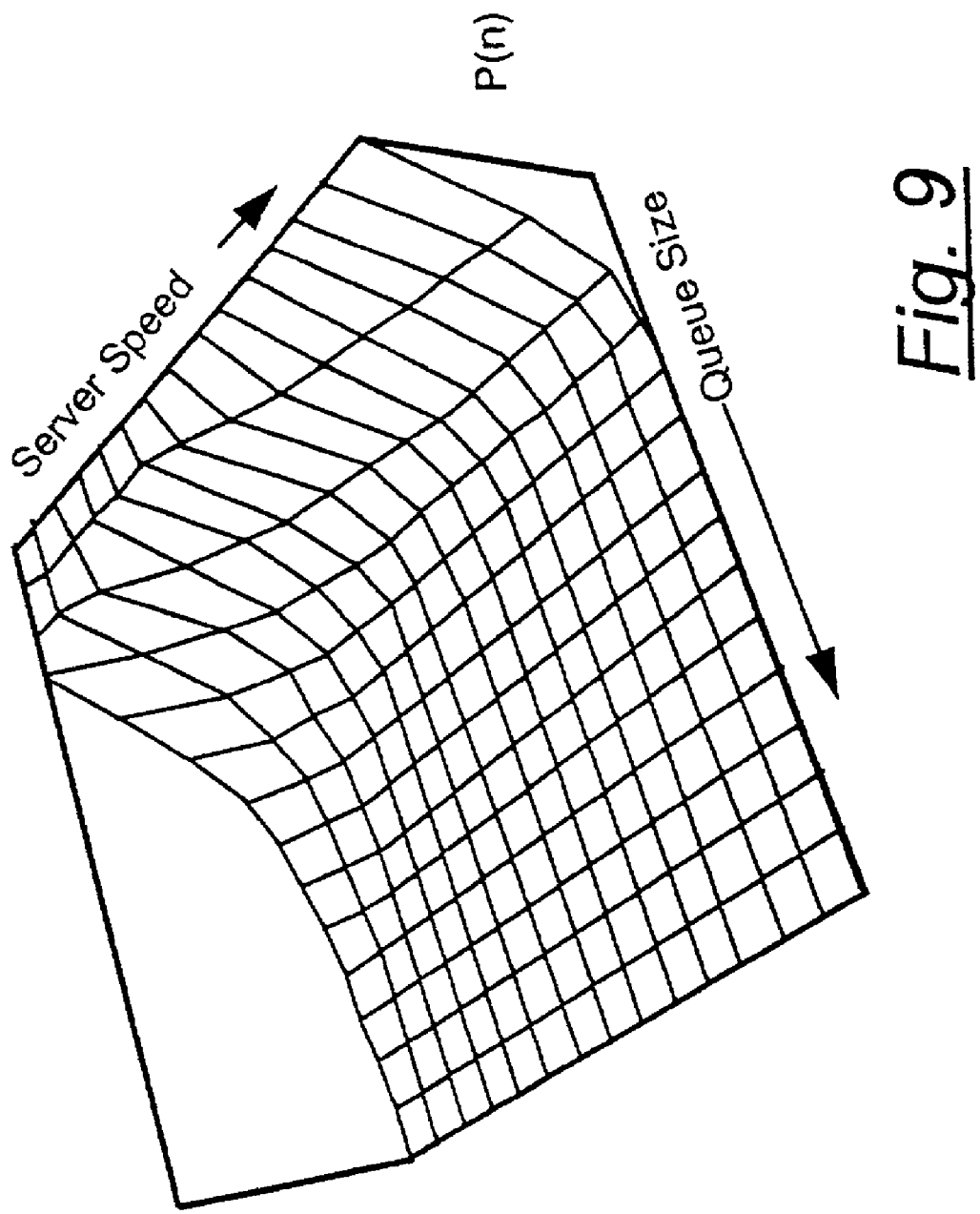
FIG. 9 illustrates in graphical form relationships between server speed, queue size, and customer wait times of an apparatus in accordance with the present invention.

FIG. 8 illustrates in block diagram for a network embodiment in accordance with the present invention. Basic components of gaming engine 800 are similar to gaming engine 100 including random number circuit 804, transform algorithms 806, public interface registry 807, and rules library 808. Main control circuit 801 includes all of the functions described herein before in reference to main control circuit 101 but also includes function for supporting network interface circuit 812. Data bus 812 couples main control circuit 801 to network interface circuit 812.

The network embodiment shown in FIG. 8 serves a plurality of player interface units 802a–801e. This additional functionality is provided in part by network interface circuit 812 and network I/O circuits 812a–812e. Network interface circuit 812 and network I/O circuits 812a–812e can be conventional network circuits used for 10baseT, ethernet, Appletalk, or other known computer network systems. In selecting the network circuits, it is important that the data throughput is adequate to meet the needs of a particular system.

Network interface circuit 812 communicates a plurality of player records of information to main control circuit 801. Main control circuit may be a conventional processing circuit that serially processes each of the player records in a manner similar to main control circuit 101. Preferably, main control circuit 801 includes multitasking or parallel processing capabilities allowing it to process the plurality of player records simultaneously.

Simultaneous processing requires that main control circuit 801 access a plurality of rules from rules library 808, each of which may require main control unit 801 to request a set of pseudo-random numbers from random number circuit 804. In a preferred embodiment, the multiple requests for pseudo-random numbers are stored in a request queue implemented in memory of main control circuit 801. The request queue is preferably able to store more than one request. A suitable request queue can store ten requests. Random number circuit 804 treats each request from the request queue of main control circuit 801 in a manner similar to the requests from main control circuit 101 described herein before. The combination of the request queue with the buffer of random number circuit 804 allows gaming engine 800 to service requests corresponding to player initiated events very efficiently. A request queue holding even two or three requests can reduce the probability of any player waiting for delivery of a set of pseudo-random numbers significantly.

The request queue can be implemented by configuring a portion of the RAM available to main control circuit 801 as a first-in first-out register or push up stack. Each request for a set of random numbers is initially placed at the bottom of the request queue and sequentially raised in the request queue until the request is filled. This operation is described herein before with respect to FIG. 7.

By now it should be appreciated that an apparatus, method, and system for gaming is provided with greatly improved efficiency and quality over existing gaming methods and systems. The universal gaming engine in accordance with the present invention is a gaming apparatus providing a consistent game development platform satisfying the needs of gaming authorities, house, player, and game developer. The gaming engine in accordance with the present invention separates the problems of developing game rules from the difficulty of producing chance events to support those rules. By including basic functions shared by a number of games, hardware costs are greatly reduced as new games can be implemented merely by providing a new set of rules in the rules library and the basic hardware operating the game remains unchanged. It is to be expressly understood that the claimed invention is not to be limited to the description of the preferred embodiments but encompasses other modifications and alterations within the scope and spirit of the inventive concept.

I claim:

1. A method for generating and applying random numbers for gaming, using an apparatus; said method comprising:

the apparatus strongly encrypting and authenticating a game control sequence, to provide a secured game control sequence;

the apparatus sending the secured game control sequence to a game;

the game strongly encrypting and authenticating game results at the game to provide secured game results;

the game sending the secured game results back to the apparatus;

the apparatus receiving the game results back from the game;

the apparatus interpreting the received results in terms of a game-control rule;

the apparatus strongly encrypting and authenticating the interpreted result; and the apparatus transmitting the interpreted result back to a remote player.

2. The method of claim 1, for use with said apparatus that includes (1) a first player interface unit receiving a request for play from a remote player and generating at least a first player record of information indicating player-initiated events from a first player, (2) a list of eligible regulated games, the status of the games, and status of connections to the games, (3) a rules library storing indexed rules for eligibility and restrictions on a particular player controlling one or more games, (4) an interface registry for storing mapping data records, the mapping data records being for mapping the first player record to preselected rules in the rules library, (5) second control means coupled to a buffer means output, the first player interface unit, the interface registry, and rules library, the second control means being for processing the player record according to said method, and each regulated game; and further comprising:

receiving a request for play from a remote player;

accepting a first player record from the remote player;

referring to the interface registry to map the first player record to a selected rule in the rules library;

determining the eligibility of the remote player to play a particular game; and executing a selected rule for game control according to the player eligibility.

3. The method of claim 2, wherein:

interpreting the received results in terms of a game-control rule comprises generating an output record indicating results of executing the selected rule, the output record being directed to a first player interface unit.

4. The method of claim 1, wherein:

interpreting the received results in terms of a game-control rule comprises generating an output record indicating results of executing the selected rule, the output record being directed to a first player interface unit.

* * * * *

UNITED STATES PATENT AND TRADEMARK OFFICE
CERTIFICATE OF CORRECTION

| | | |
|---|---|---|
| PATENT NO. | : 6,986,055 B2 | Page 1 of 2 |
| APPLICATION NO. | : 09/143907 | |
| DATED | : January 10, 2006 | |
| INVENTOR(S) | : Rolf E. Carlson | |

It is certified that error appears in the above-identified patent and that said Letters Patent is hereby corrected as shown below:

On the title page item (54), and Column 1, Lines 1-2, Delete "METHOD FOR GENERATING RANDOM NUMBERS" and insert --METHOD FOR CONTROL OF GAMING SYSTEMS AND FOR GENERATING RANDOM NUMBERS--, therefore.

On the title page, item (56) References Cited, Column 1, under U.S. Patent Documents, Line 1, after "Vasseur" insert --708/250--.

On the title page, Column 2, under U.S. Patent Documents, Line 7, after "Aiello et al." insert --380/46--.

On the title page, Column 2, under U.S. Patent Documents, Line 10, after "Anderson et al." insert --380/46--.

In the Drawings sheet 3 of 9, box 301, Figure 3, Line 2, Delete "Distribtion" and insert --Distribution--, therefore.

Column 2, Line 20, After "manage risk." Delete "In" and insert --It--, therefore.

Column 3, Line 13, After "increasing" Delete "he" and insert --the--, therefore.

Column 3, Line 57, Delete "DRAWING" and insert --DRAWINGS--, therefore.

UNITED STATES PATENT AND TRADEMARK OFFICE
CERTIFICATE OF CORRECTION

PATENT NO. : 6,986,055 B2
APPLICATION NO. : 09/143907
DATED : January 10, 2006
INVENTOR(S) : Rolf E. Carlson It is certified that error appears in the above-identified patent and that said Letters Patent is hereby corrected as shown below:

Column 4, Line 13, Delete "DRAWING" and insert --DRAWINGS--, therefore.

Column 7, Line 21, Delete "Sytsem" and insert --system--, therefore.

Column 10, Line 21, Delete "S Ram" and insert --SRAM--, therefore.

Signed and Sealed this

Thirteenth Day of May, 2008

JON W. DUDAS
*Director of the United States Patent and Trademark Office*